(12) United States Patent
Lazarevic

(10) Patent No.: US 7,743,510 B2
(45) Date of Patent: Jun. 29, 2010

(54) POWERED TOOL FOR TUBE CUTTING AND TREATING

(75) Inventor: Milisav Lazarevic, Racine, WI (US)

(73) Assignee: OSG Power Tools, Inc., Bensenville, IL (US)

( * ) Notice: Subject to any disclaimer, the term of this patent is extended or adjusted under 35 U.S.C. 154(b) by 716 days.

(21) Appl. No.: 10/593,935

(22) PCT Filed: Mar. 4, 2005

(86) PCT No.: PCT/US2005/007444

§ 371 (c)(1),
(2), (4) Date: Sep. 25, 2006

(87) PCT Pub. No.: WO2006/007444

PCT Pub. Date: Sep. 14, 2006

(65) Prior Publication Data

US 2007/0214648 A1 Sep. 20, 2007

(51) Int. Cl.
*B23D 21/00* (2006.01)
*B23D 21/08* (2006.01)
*B26D 3/16* (2006.01)

(52) U.S. Cl. .................. 30/102; 30/97; 30/101
(58) Field of Classification Search .............. 30/97, 30/101, 98, 95, 96, 99, 102, 92–94; 81/61, 81/60, 62, 63, 63.1, 63.2, 12.1, 57.39; 241/297; 82/70.1, 70.2, 72, 73, 113

See application file for complete search history.

(56) References Cited

U.S. PATENT DOCUMENTS

| | | | |
|---|---|---|---|
| 2,753,744 A | 7/1956 | Therien | |
| 3,848,489 A * | 11/1974 | Santana | 82/61 |
| 4,422,238 A * | 12/1983 | Kloster | 30/101 |
| 4,438,562 A | 3/1984 | Courty | |
| 4,769,911 A | 9/1988 | Araki | |
| 4,802,278 A | 2/1989 | Vanderpol | |
| 5,088,196 A | 2/1992 | Fukuda | |
| 5,142,825 A | 9/1992 | Floyd | |
| 5,243,760 A | 9/1993 | May | |
| 5,495,672 A | 3/1996 | Kritchever | |
| 5,881,616 A * | 3/1999 | Nanzai | 82/72 |
| 5,943,778 A | 8/1999 | Alana | |
| 6,065,212 A * | 5/2000 | Lazarevic | 30/101 |
| 6,202,307 B1 | 3/2001 | Wrate | |
| 6,336,270 B1 | 1/2002 | Dureiko | |
| 6,430,815 B1 | 8/2002 | Wickline | |
| 6,481,105 B1 | 11/2002 | Haung | |
| 6,637,115 B2 | 10/2003 | Walsh | |
| 2004/0025351 A1 | 2/2004 | Lee | |
| 2005/0247171 A1 * | 11/2005 | Kawashima | 82/113 |

\* cited by examiner

*Primary Examiner*—Ghassem Alie
(74) *Attorney, Agent, or Firm*—Olson & Cepuritis, Ltd.

(57) ABSTRACT

A tool for power cutting and treating a tube or the like, and having a power source and an open end for receiving the tube for cutting. There are a tube cutter and rollers for rotation around the tube during cutting. A tool housing encloses the cutter and rollers and also two gear trains which can rotate at different speeds. One of the trains creates tool rotation drive and the other of the trains creates tube cutting. The rotation drive can be reversed for setting the cutter and rollers in starting positions, along with setting and presenting the open end to the next tube to be cut. The rotating gears also drive two power-take-offs for treating the tube.

3 Claims, 8 Drawing Sheets

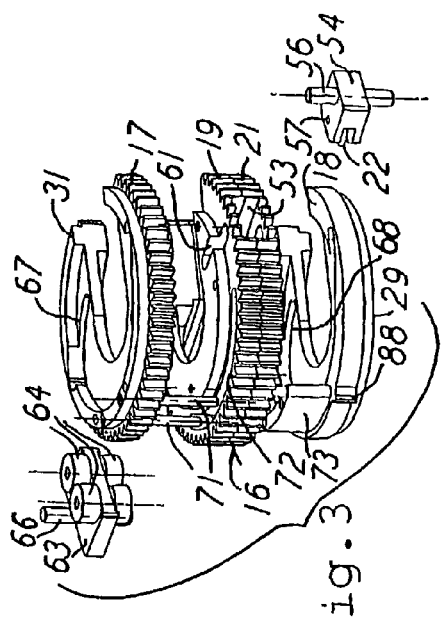
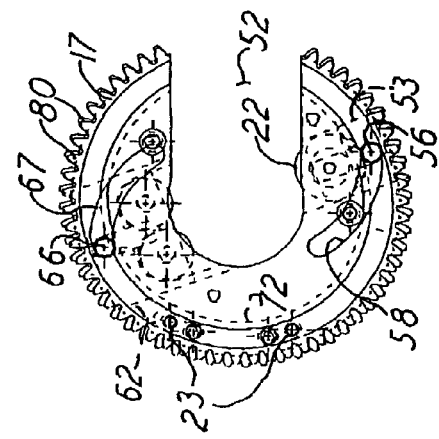
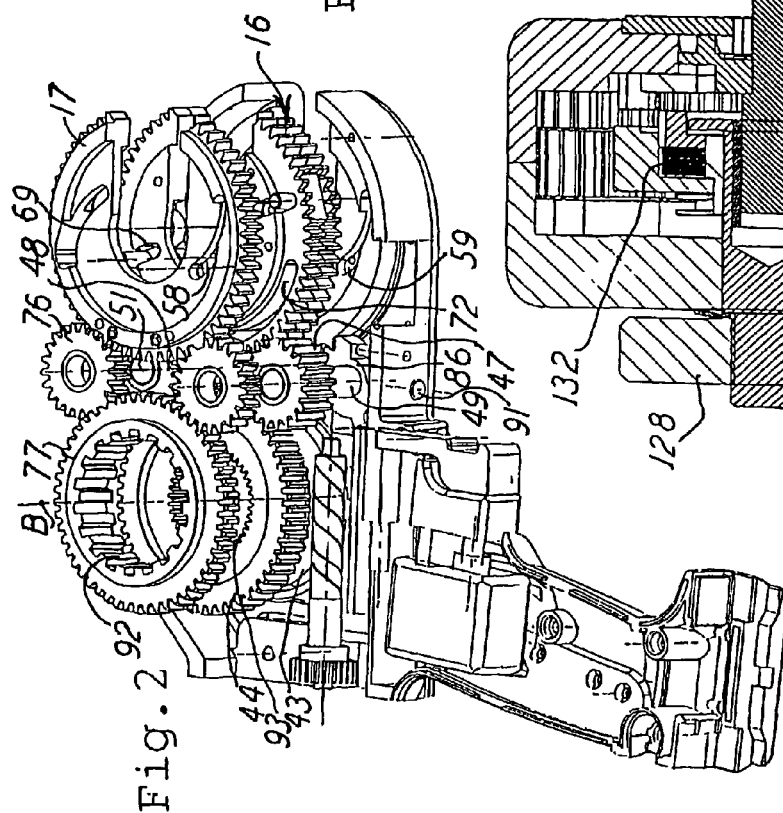
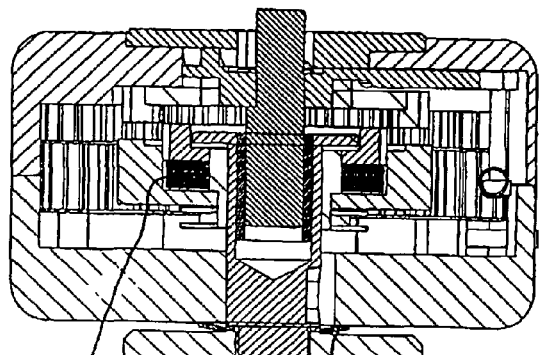

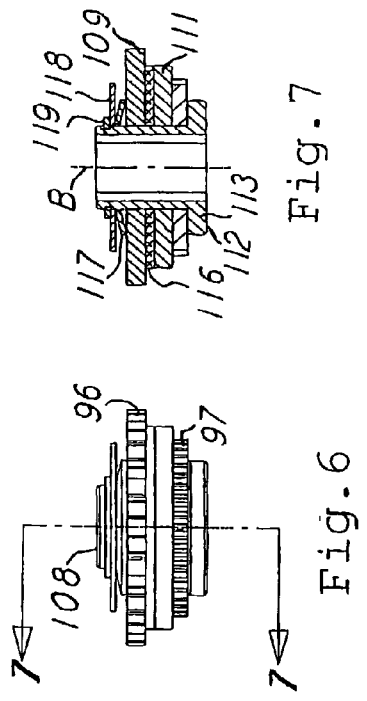
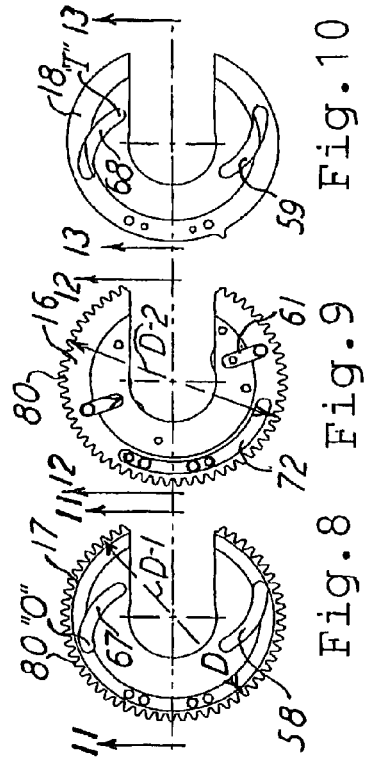
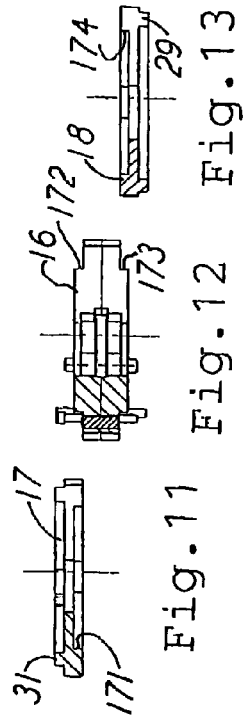
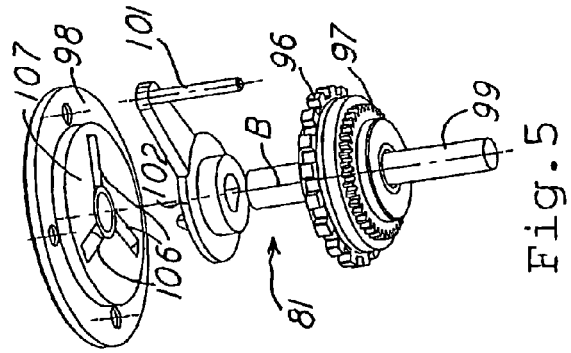
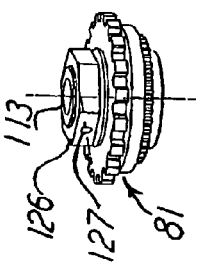

POWERED TOOL FOR TUBE CUTTING AND TREATING

This invention relates to a powered tool for tube cutting and treating, and particularly to a powered tube tool which is portable and hand manipulable.

BACKGROUND OF THE INVENTION

Hand held powered tube cutters and treating tools are already known in the prior art, and they are useful in, cutting tubes or pipes on the work site and in restricted spaces. For instance, U.S. Pat. No. 6,065,212 discloses one such tube cutter. Other prior art cutters are different from the present invention in that they do not provide for continuous cutter feeding, nor for automatic settings for various tube or pipe diameters to be cut, nor for efficient constant cutter feed systems without shock loads to the tube.

The present invention provides for a tool of a powered tube cutter which automatically adjusts for different diametrical sizes of tubes. There are self-centering guides which act to place the cutting mechanism centered with the tube, and there is provision for visibly aligning the cutter on the tube when the tube is disposed within the tool. Further, the amount of cutting penetration for each revolution of cutting action can be selected, and can be altered during cutting, and there is chipless cutting of various materials, such as plastic and copper, and for harder materials, such as steel and titanium.

The cutter has an access head, with tube guides and sighting openings, for easy application onto, and removal from, the tube, and there is a revolving head for rotation around the tube to be cut. The tool has a cutting blade and tube contacting rollers which automatically and continuously move in unison radially toward and away from the tube. Before that radial feed mechanism is engaged, in the first portion of the cutting head revolution, the tool performs an automatic and quick sizing of the tube. Also, after each tube has been cut, the tool quickly reverses rotation and automatically stops in an aligned position with the cutting blade and support rollers retracted and thereby ready for the next tube to be cut.

The tool has an adjustable cutter feed rate, which is useful for varying cutting speeds and for tubes having various material hardnesses. Also, the revolutions can be accomplished through self-contained battery power or from another power tool which readily driving connects to the tool of this invention. There is an automatic feed of the cutting blade into the tube, and that is achieved by a clutch acting on a feed drive where the rate can be controlled by varying the torque transmitted to the feed drive. Thus, there is a drive arrangement for moving the cutter blade around the tube, and there also is a feed arrangement for moving the cutter blade radially inward on the tube in the cutting process. The operative positions for the cutting action are automatically achieved and are under the control of a single control button, for instance.

Prior to each cutting action, the tool is automatically placed in a tube-receiving mode and in tube contact, and it is thusly ready to cut. After cutting, the tool automatically sets itself into a condition to be ready to receive the next tube.

This tube cutter is easy to operate, it is fast in cutting completely through a tube, it produces a clean tube cut so that the cut edges end are smooth and circular, and it operates in close clearance locations, such as on job sites. Two gear trains are provided, one for rotation drive and one for cutting drive, and the two speeds are different from each other to thereby have the cutting speed lag the drive speed and thereby cam the cutting blade into the tube upon each revolution.

The tool also has power-take-off outlets for rotationally driving accessory instruments, including a tube de-burring tool and a tube rotating brush. That prepares the cut tube for subsequent soldering or other operations.

BRIEF DESCRIPTION OF THE DRAWINGS

FIG. 2 is a side perspective view similar to FIG. 1, but slightly enlarged and with parts of FIG. 1 omitted.
FIG. 3 is an exploded perspective view of FIG. 2 parts.
FIG. 4 is a top plan view of assembled parts of FIG. 3.
FIG. 5 is a bottom perspective view of parts of FIG. 1.
FIG. 6 is a side elevation assembly view of a portion of FIG. 5.
FIG. 7 is a section view taken on a plane designated by the line 7-7 on FIG. 6.
FIGS. 8, 9, and 10 are a top plan views of three parts shown in FIG. 3.
FIGS. 11, 12, and 13 respectively are section views taken on planes designated by the lines 11, 12, and 13 respectively on FIGS. 8, 9, and 10.
FIG. 15 is a perspective view of another embodiment of the clutch part of FIG. 5.
FIG. 22 is an enlarged section view of a portion of FIG. 16 taken on a plane designated 22-22 of FIG. 16.

DETAILED DESCRIPTION OF PREFERRED EMBODIMENTS

Figure 1:
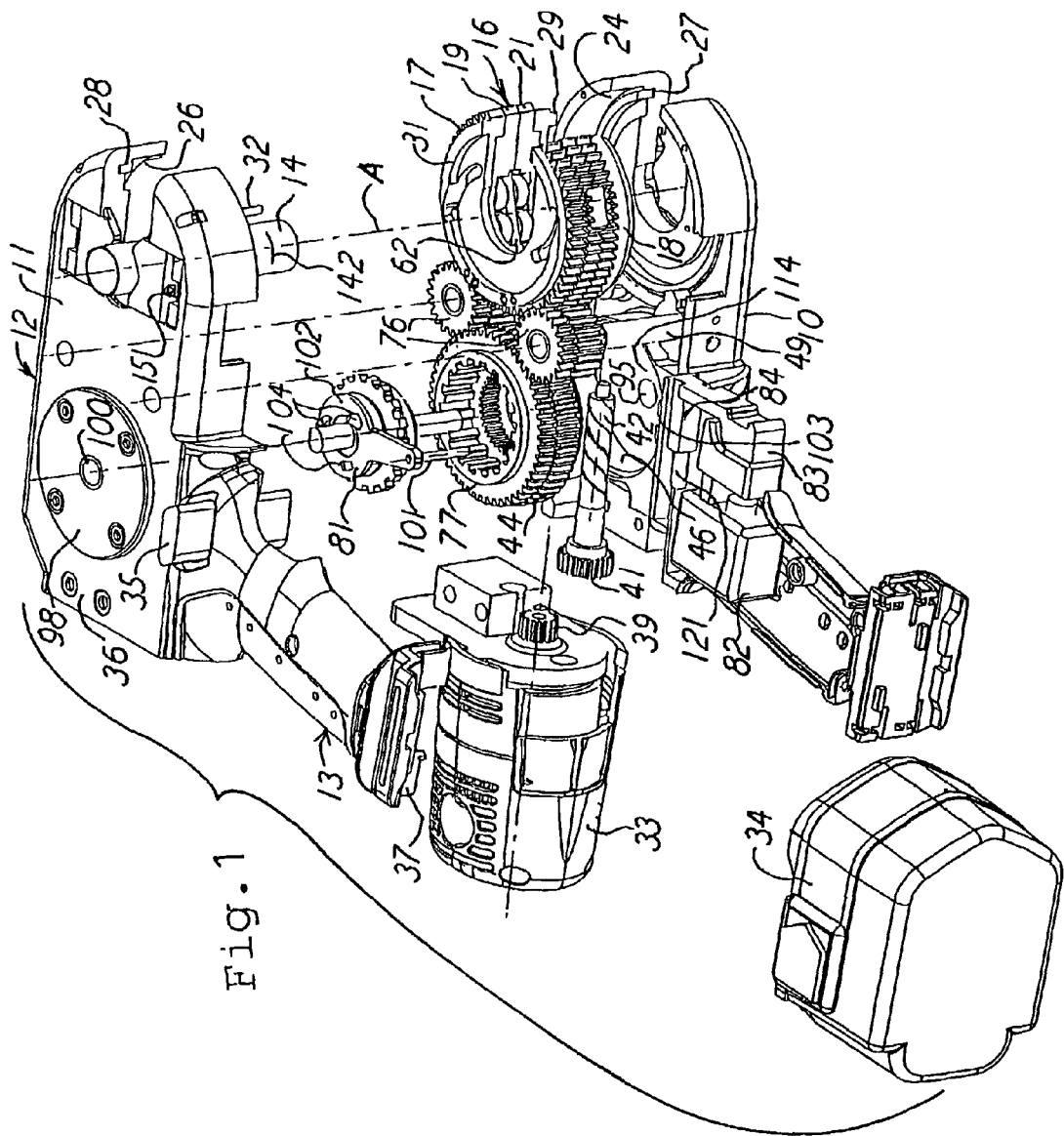
FIG. 1 is a side perspective exploded view of the cutter tool of this invention.
Figure 14:
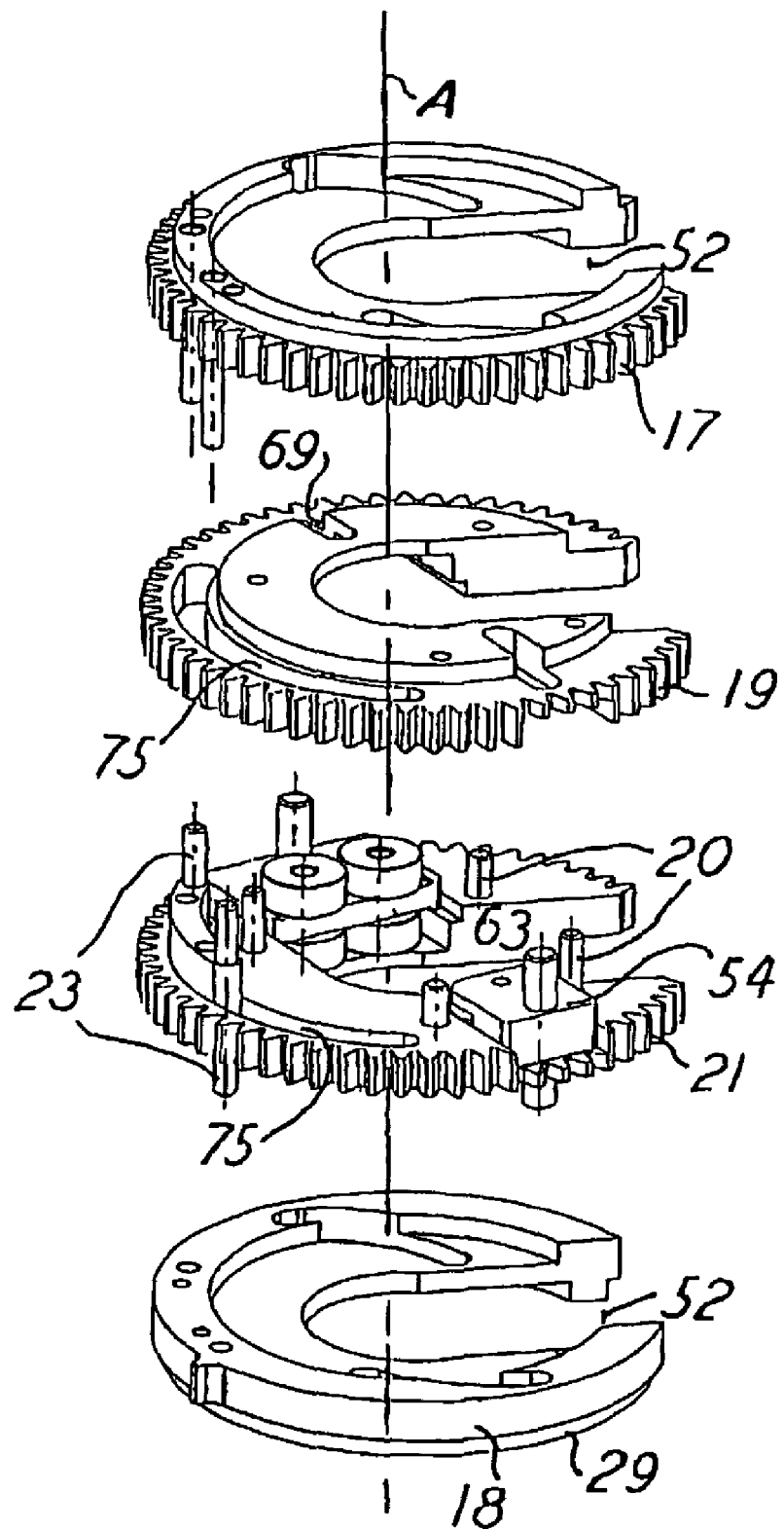
FIG. 14 is an exploded perspective view like FIG. 3.

Generally, there are a tube cutting blade and supporting rollers which engage the tube to be cut and which are automatically positioned to be concentric relative to the longitudinal axis of the tube. Further, the tool is arranged so that a drive reverse to that of the cutting action rotation drive will automatically open the tool for receiving the tube and be automatically centered on the tube during tube cutting. In this description, reference to up, down, top, lower, and that type of orientation simply is in reference to the orientation of the tool as shown in the drawings herein.

The cutting blade revolves centrally around the tube, and the depth of cut for each revolution is controlled so that tubes of hard material can be cut with one amount of cutting penetration per revolution, and tubes of softer material can be cut with another amount of penetration per revolution. The description herein can be enhanced by reference to my U.S. Pat. No. 6,065,212.

FIG. 1 shows the tool to include two housing halves 10 and 11, and, when assembled and suitably connected together, they present a body and head portion 12 and a handle portion 13. The operator can grip the shown handle 13 and direct the head portion 12 onto a tube 14 which is a workpiece and which is to be cut transverse to its longitudinal axis which is upright and designated A in FIG. 1. It can be understood that the tube 14 is already installed in a fixed on-the-job position, but the end of the tube is to be cut off.

FIG. 3 shows an assembly which has a rotation drive spur gear 16 and a cutter feed assembly having a spur gear 17 and a cam or cutter control plate 18. The gear 16, which is shown in upper and lower halves 19 and 21 held together by pins 20, is driven to produce rotation of the assembly shown in FIG. 3 about its central longitudinal axis A. That compound gear 16 supports and carries a rotatable circular tube cutter 22. Upon rotation of the gear 16 about axis A, the cutting blade 22 will rotate in friction rolling contact with the tube 14, and, as described later, will radially advance into and through the wall of the tube 14.

The gear 17, like gear 16, is circular in the axial view thereof, and has its spur teeth projecting outwardly on its teeth pitch circle, but not in a full circle. The two halves 19 and 21 are mirror image halves which actually form the one gear 16, and that is the rotation drive gear, and the halves are aligned, and together they present one total height of gear teeth on gear 16.

That assembly of the feed gear 17, drive gearing 19, 21, and the cam plate 18, in final assembly, are in stacked axial contact with each other and are aligned by pins 23 and are rotatable relative to the housing body 12. Thus, the housing halves 10 and 11 present cavities 24 and 26 for reception of those parts and to rotatably support them. The housing halves have circular bearing grooves 27 and 28, and the plate 18 and gear 17 have axial extending ridges 29 and 31 which respectively mate with the grooves 27 and 28 for rotation guidance and support of the gear plate 18 and the gear 17 in what is defined as circular shoulder radial abutment or tongue-and-groove connection. The housing halves 10 and 11 are secured together in abutment by screws, like screw 32.

Suitably attached to the housing body 12 are a reversible electric motor 33 and an electric battery 34 for powering the motor 33 in the two directions of rotation. An electric reversing polarity switch 35 is suitably mounted on the handle 13 and is electrically connected with the motor 33 for reversing rotation drive, when desired. The motor can be attached at 36 on the housing body 12, and the battery can be attached at the bottom 37 of the handle 13. The motor 33 presents a rotation drive pinion 39 which will be in spur teeth drive with a spur gear 41 in the housing 12. Instead of the motor 33 and battery 34, there could be a discrete power source, such as a rotation tool, which could be connected to and which thusly rotates the gear 41. While not shown, the discrete power source can be conventional and is well known.

Gear 41 is on a shaft 42 which is suitably rotatably mounted on the housing 12, and it should be understood that gear 41 is a worm gear in tooth-driving relationship with a worm wheel 43. For drawing clarity, the worm teeth of the worm 43 are not shown herein, but it should be understood that they are conventional so need not be more fully shown.

A spur gear 44 is rotatably supported in a circular cavity 46 in the housing half 10 and is mounted above the worm wheel 43 and is rotatably connected thereto such as by unshown pins like pin 20 extending therebetween. Two idler spur gears 47 and 48 are rotatably mounted on housing posts 49 and 51, respectively, and they are in driving relationship with respectively diametrically larger spur gears 44 and 16 to transmit rotation from the gear 44 to the gear 16. Idler gears 47 and 48, are spaced apart long the circumference of the gear 16 to span gap 52 in the gear 16 and thereby always have one of the idler gears in driving relationship with the driven gear 16. That gap or opening 52, which is also shown and is included in the gear 17, cam plate 18, and the two housing halves 10 and 11 extends radially to receive the tube 14 extending beyond the axis A, in the usual manner.

Gear 16 has a square radial opening 53 which receives a blade support 54 which has a shaft 56, and the cutting blade 22 is rotatable on a pin 57 on the support 54. The two ends of the shaft 56 are snugly received in arcuate slots 58 and 59 respectively in the gear 17 and the cam plate 18. The shaft 56 also passes through a radial slot 61 in the gear 16. The support 54 is rectilinear to snugly fit in the rectilinear opening 53 in the gear 16 and thereby be stable therein and firmly support the cutting blade 22. Thus there is the arrangement of the two halves 19 and 21 to form the gear 16 because the manufacturing is most accurate and simplified.

A rectilinear radial opening 62 is disposed in the gear 16 and is diametrically opposite the opening 53 and is of the same configuration and construction. A rectilinear support block 63 is disposed in the opening 62 and is stably snug therein and rotatably supports and presents four rollers 64 in the gap 52 and onto the tub 14. Rotation of the gear 16 causes the blade 22 to cut into and through the tube and causes the rollers 64 to roll over the circumference of the tube during cutting. The support 63 has a shaft 66 which has its two opposite ends respectively disposed in two arcuate slots 67 and 68 in gear 17 and plate 18. Shaft 66 also extends through a radial slot 69 in the gear 16. Rotation of the gear 17 along with the same rotation of plate 18, where that rotation is at a speed different from that of the rotation of gear 16, will cause the shafts 56 and 66 to slide in the three respective slots to radially move the blade 22 and the rollers 64.

The gear 17 and the plate 18 are unified by being joined by screws 71 which pass through an arcuate slot 72 in the intervening gear 16. Axial spacer 73, such as shown to be vertical in FIG. 3, is between the gear 17 and the plate 18 and it freely extends through the shown slots 75 in the gear 16, and it prevents binding of the halves 19 and 21 by the tightened screws 71. Also, the alignment pins 23 extend between the gear 17 and plate 18 to assure the alignment of the arcuate slots 58 and 59 and of the slots 67 and 68.

The assembly of the cutting feed gear 17, rotation drive gear 16, slot plate 18, cutting blade assembly with blade 22, and roller assembly with rollers 64, present a unit termed the cutting head assembly. That includes both the rotation drive and the cutting blade feed. The spur gear drive train through the gear 44, idlers 47 and 51, and to the rotation drive gear 16 can be at a rotational speed different from that of the cutting feed gear 17. The drive between gear 16 and gear 17, which also rotates plate 18, is through the shafts 56 and 66 which rotationally act on the radial slots 61 and 69 in gear 16, and that rotation drive goes into the arcuate slots 58, 59, 67 and 68. Those slots serve as cams, and the shafts 56 and 66 serve as cam followers.

The rotation of the gear 17 and cam plate 18 is controlled by two idler gears 76 which are rotatably mounted on the housing supported posts 49 and 51 and they are in tooth relationship with the gear 17 and they span the gap 52 in the gear 17. A command cutting feed ring spur gear 77 is rotatably mounted in the housing body 12, and is rotatably guided therein as with the circular ridges 31 and 29 on gear 17 and plate 18. Gear 17 is in tooth mesh with the two idlers 76. Gear 44 is also a ring spur gear, and it is the command rotation drive gear. Gears 44 and 77 can be rotationally connected together to rotate in relative step with each other, as more fully described later.

Drive gear 16 and feed gear 17 have a different total quantity of teeth 80 thereon. That is, the number of teeth on gear 16 is larger than the number of teeth on gear 17, in this showing.

That is displayed in FIG. 4. Also, the command drive gear 44 has a greater number of teeth than that on the command feed gear 77. One example is that gear 16 could have sixty total teeth while gear 17 could have fifty-nine total teeth, and gear 77 could have fifty-one total teeth and gear 44 could have fifty-two total teeth. Those teeth numbers pertain to the full gear circumference, including the gap portions 52, so consider all the way around the complete circumference of each gear for tooth counting. That larger and smaller relationship between gears 16 and 17 will be imposed as larger and smaller on the gears 44 and 77. However, the larger and smaller relationship could be reversed in the corresponding relationship within and between both sets of gears, and it is only the differential in rotation speed, that is the lost rotation motion, within each set of those two gears that is required. The two idler gears. 47 and 48 have the same but correspondingly lesser number of teeth compared to the number of teeth on the two idlers 76, and thus all four idlers respectively accommodate the difference of the number of teeth in the gears on their adjacent flanks, and all those teeth respectively mesh with the respective adjacent gears. The profiles of all the teeth are the same.

The gear differences mentioned result in correspondingly different pitch diameters of the respective gears, such as between 16 and 17 where 16 is now shown to be of a greater pitch diameter compared to that of gear 17. As displayed in FIGS. 8 and 9, gear 17 has a pitch diameter D-1 and gear 16 has a pitch diameter D-2, and that is the conventional measurement of a gear pitch diameter for the pitch circle of a spur tooth gear, such as with these teeth 80. That difference produces a relative rotation between the gears 16 and 17, with the gear 17 rotating slower that that of gear 16, and that activates the identical amount of radial displacement of the cutting blade 22 and the rollers 64. That cutting rotation is clockwise a viewed in FIG. 4.

The arcuate slots 58, 59, 67, and 68 all extend from a radial outer location "O" to a radial inner location "I" and they all have a curvature where that inner location is in a rotationally leading position on the arc with regard to the cutting rotation. That is, see FIG. 10 and consider the clockwise cutting rotation.

Counterclockwise rotation, which the applied power is capable of producing upon reversing the motor 33, will reset the gears and the plate 18 to present the aligned gaps 52 in the housing halves 10 and 11 and in the entire cutting head seen in FIG. 3. That opens the cutting head for reception of a tube 14 for the next cutting project.

The number of teeth, like their respective pitch diameters, on gears 16 and 17, and also on gears 77 and 44, could be reversed in the mentioned greater and lesser relative locations, and then the upper gears could have the greater number of teeth. In that event, the cam slots 58 and 59 and slots 67 and 68 would be orientated in the direction to the other side, as viewed in FIGS. 1 and 2, and then the rotation of the cutting head would be in the direction reverse from that mentioned for radial movement of the blade 22 and rollers 64. In both larger and smaller gear teeth, and consequent pitch diameter, relationships, the only requirement is that the gears have a different number of teeth, and that is also different pitch diameters. In the gear trains shown herein, the smaller gear 17 will rotate slower.

Figure 23:
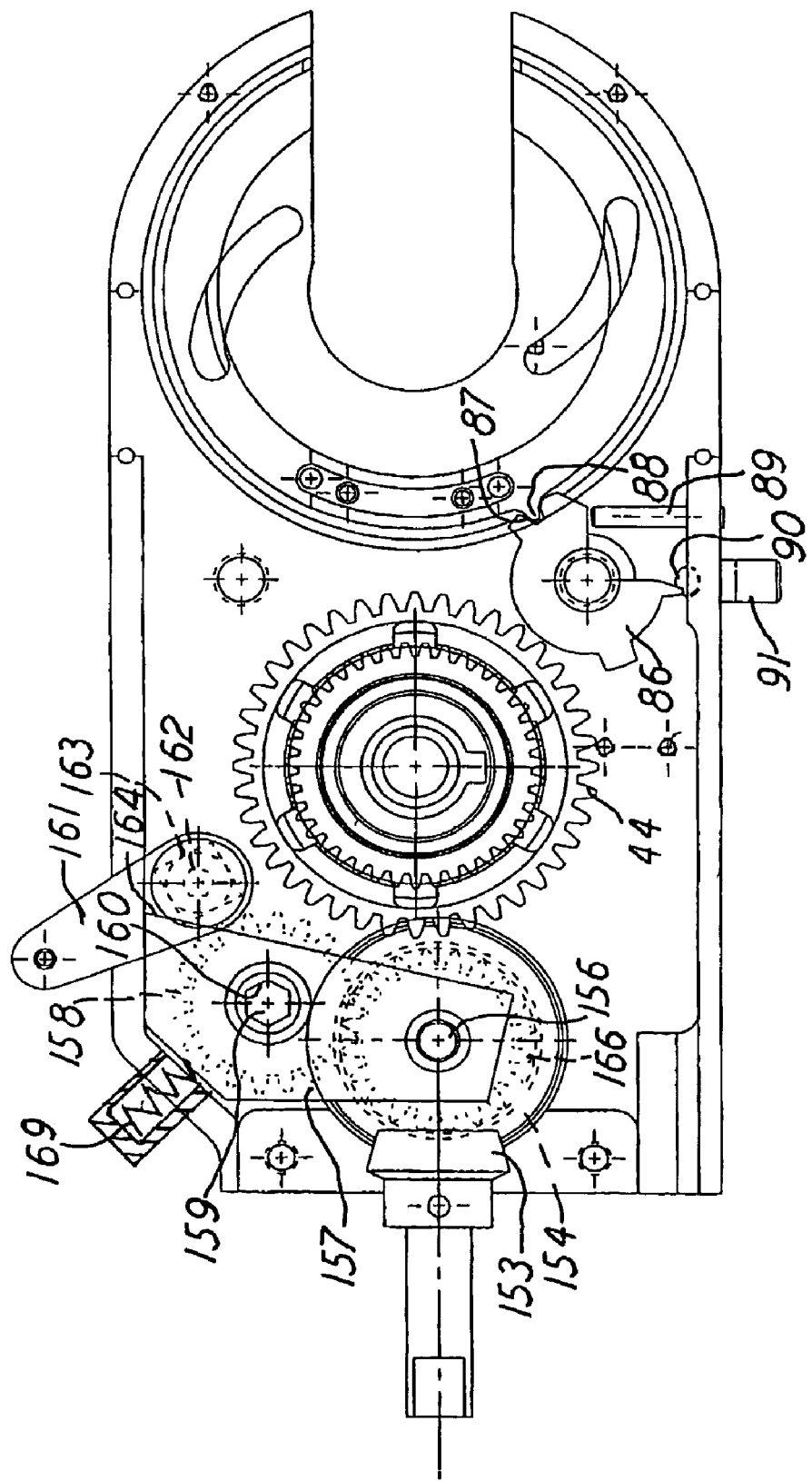
FIG. 23 is an enlarged top plan view of a portion of FIG. 18.

For further controlling the slower rotation of the feed gear 17 compared to the rotation speed of the drive gear 16, a rotation clutch 81 is applied to the drive gear train of the feed gear as seen in FIGS. 5, 6, and 7. The tool body 12 has an electric switch 82 which is operated by finger pressure on a slideable bracket 83 connected to the switch 82 and it carries a shifter 84 for movement therewith. The motor 33 is then powered by the battery 34, or there may be any discrete external power supply. Through the lower gear train described, the applied power rotates the drive gear 16 in the clockwise direction, per FIG. 1. FIGS. 2 and 23 show a rotation stopper 86, namely a detent, pivotally mounted on the post 49, and it has a notch 87 which receives a projection 88 on the plate 18 to control rotation of the plate 18. An adjustment screw 89 is in the housing half 10 and extends into contact with the detent 86 to provide for limiting clockwise pivotal positioning of the pivotal detent 86 about the post 49. Also, a standard compression spring is in the housing at 91 and it urges a ball 90, as another detent, into releasable contact with the detent 86 to allow pivoting of the detent 86 about the post 49 and to position the detent into the FIG. 23 engaged setting. Therefore, the detent is able to pivot counterclockwise, and away from the screw 89 and allow clockwise rotation of the plate 18. In a limited amount, just enough to position plate 18 in its starting position shown in FIG. 23.

The detent 86 limitly rotationally holds the plate, and thus the attached gear 17, against rotation until the cutting blade 22 and rollers 64 contact the tube 14. Upon tube contact, the feed gear 17 and plate 28 will be forced to rotate around axis A at the same speed as that of the drive gear 16. Thus, feed gear 77 will be rotated but, due to the different number of teeth in the two gear trains, gear 77 will rotate at a different speed from that of drive gear 44. Rotation of the gear 77 will induce rotation in the clutch 81 about axis B.

Gear 77 has interior spline teeth 92 and gear 44 has interior spline teeth 93. Clutch 81 has exterior spline teeth 96 and spline teeth 97 and the latter respectively mesh with the teeth 92 and 93, in the nature of spline connections, as shown. The clutch 81 has cover plate 98 which is screw-mounted on the housing 12, as seen in FIGS. 1 and 5. The entire clutch 81 has a central post 99 which is mounted on the housing 12, including the mounting in the housing opening 95 and in the opening 100 on the plate 98, as indicated in FIGS. 1 and 5, and the post 99 can move slightly up and down along its longitudinal axis B, and the clutch 81 will move up and down with the post 99 to which the clutch is attached axially. With that up and down movement, the clutch spline teeth 96 and 97 respectively engage and disengage relative to the mating spline teeth 92 and 93 on gears 77 and 44. Clutch splines 92 and 93 also can rotate independently on the post 99.

When the clutch spline teeth 96 and 97 are in their lowered positions they are respectively engaged with clutch spline teeth 92 and 93 on gears 77 and 44, the clutch will then rotate with the rotation of the gears 77 and 44. A control arm 101 is dependendingly connected to a plate 102 which sits on top of the clutch 81 and is piloted on the post 99 to move axially thereon but to rotate therewith. The arm 101 extends to a slot 103 which is in the trigger bracket 84 and is movable therewith.

So movement of the trigger 83 beyond an initial movement causes motion in the arm 101 and the plate 102 about axis B. FIG. 1 shows three cam projections 104 spaced apart on the top of plate 102, and the cover plate 98 has three grooves 106 extending radially therein and in the circular spacing as that of the projections 104. So projections 104 can be received in respective downwardly open grooves 106 in the cover plate 98, and, at that condition, the plate 102 is in its upward position relative to the remainder of the clutch 81. Rotation of the plate 102 by the triggering action causes projections 104 to be moved out of their grooves 106, and the projections then contact the underneath planar surface 107 of the plate 102 to thereby press the plate 102 downward onto the upper surface 108 of the clutch 81. That produces the spline engagements mentioned above.

The spline teeth 96 are integral with an upper pressure plate 109, and spline teeth 97 are integral with a lower pressure plate 111. FIGS. 6 and 7 show the plates 109 and 111, and they are mounted on a flanged sleeve 113 which will actually bottom out in lowering by having its lower surface 112 engaging a portion 114 of the housing half 10. There is a friction insert 116 between the two pressure plates, and there is a flat spring 117 between the upper plate 109 and a washer 118 for urging the plates toward each other for friction drive therebetween. A washer 118 and a snap ring 119 hold the assembly together in the down direction. So there can be rotation slippage, as mentioned above, in each revolution, and that amount of slippage is determined by the friction action of the pad 116. Maximum slippage is equal to the angular equivalent of the difference in the number of gear teeth. For example, if there is one tooth difference in a sixty tooth gear, the angular equivalent is six degrees.

After the tube 14 is completely cut, the operator will release extension bracket 83 of the shifter 84 causing retraction of the shifter against the compression force of a spring plunger at 121. That will cause arm 101 to rotate cam plate 102 back to its latched position with the grooves 106, under the axial force of the unshown spring at 114 acting upwardly on the sleeve 113. That will disconnect the command drive gear 44 from the command feed gear 77. Then, upon reversing motor 33 by shifting polarity there will be reverse rotation of command drive gear 44 and of drive gear 16. That will cause cutting blade 22 and rollers 64 to move radially outwardly to the outer ends of their respective slots, while feed gear 17 and cam plate 18 will be rotationally dragged counter-clockwise. When projection 88 on cam plate 18 rotates to latch with the detent 86, rotation will be stopped by the detent 86 and the five gaps at 52 will all be aligned, and thereby open, for the next tube reception and cutting action.

Figure 18:
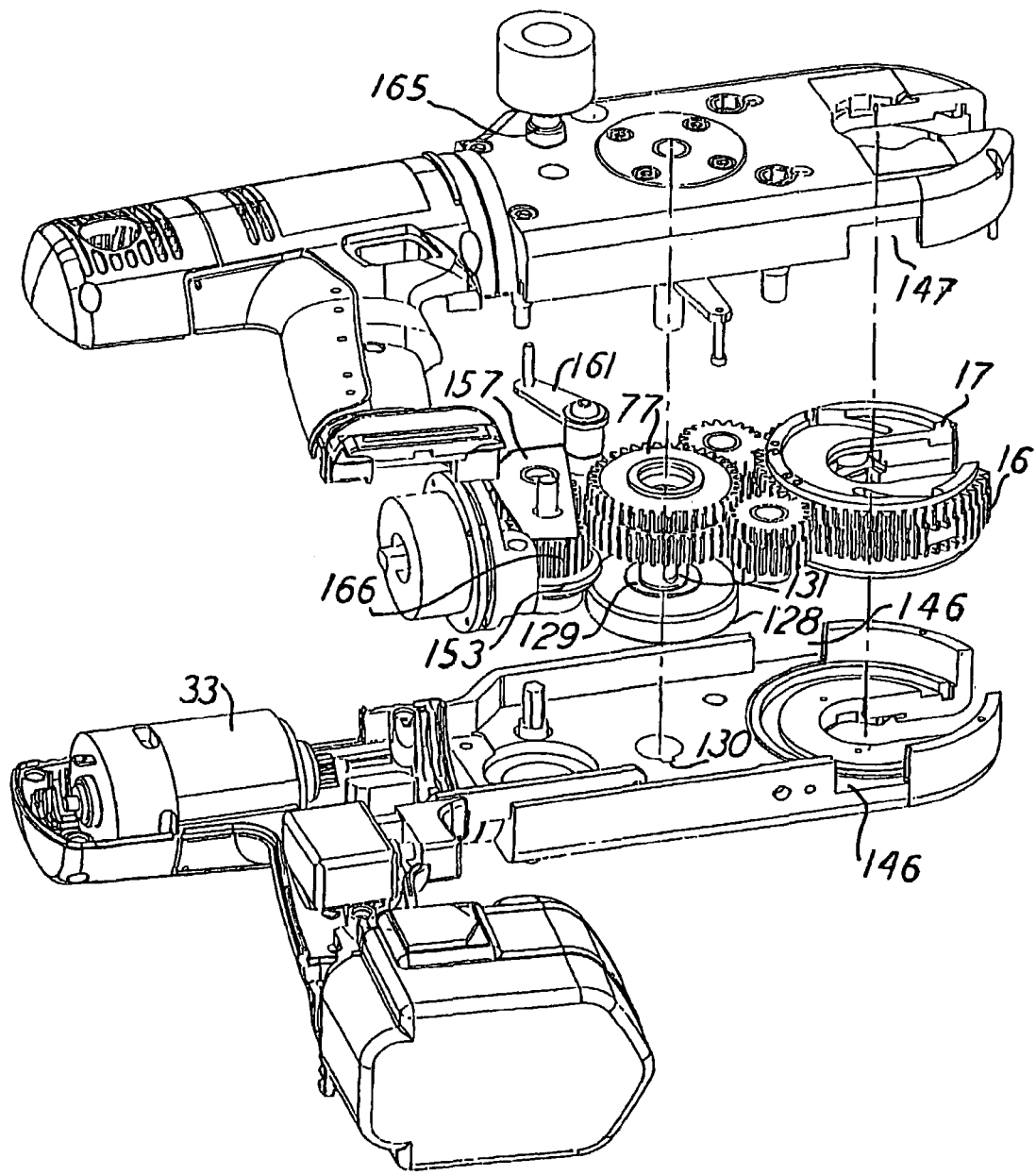
FIG. 18 is a bottom perspective exploded view of FIGS. 16 and 17.
Figure 21:
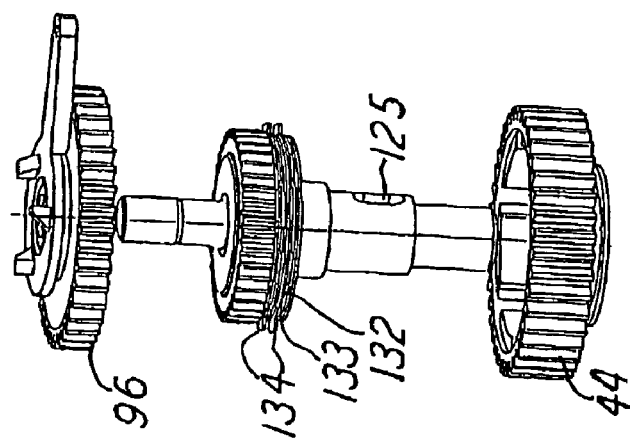
FIG. 21 is an exploded perspective view of FIG. 19.
Figure 20:
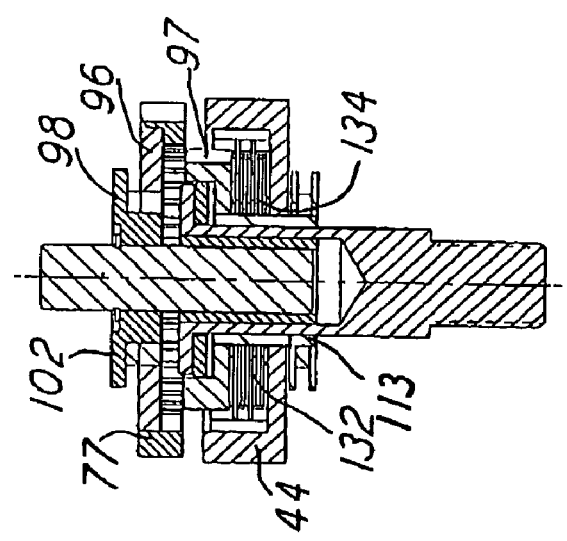
FIG. 20 is a section view taken on a plane designated by the line 20-20 of FIG. 19.
Figure 19:
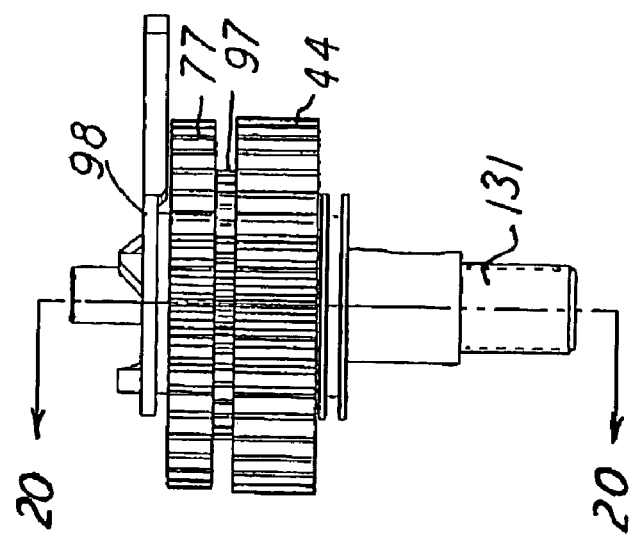
FIG. 19 is a side elevation view of another embodiment of the clutch part of FIG. 1.

To avoid damage to the motor 33 when detent 86 abruptly stops rotation, the electric current monitoring circuit should be integrated in the switch reverse position. Mechanical solution for this is shown in FIGS. 18 and 23.

When clutch 81 is not engaged for its subsequent firm rotation drive therethrough, the blade 22 and roller 64 move radially inward to contact the tube 14. When tube cutting is to occur, because gear 17 is smaller than gear 16, gear 17 will rotate slower than gear 16 and that will create the radial movement of the blade 22 and rollers 64. Engagement of the clutch 81 will produce that drag. That produces a rotation lost motion between the gears 16 and 17 for the desired radially inward movement of the blade 22 and the rollers 64.

FIG. 15 shows an adjustable torque clutch where spring compression and friction force can be achieved by an adjustable nut 126 on the upper end of a now modified sleeve 113 which is modified to threadedly receive the nut 126. A set screw 127 can be applied to the nut 126 and the modified sleeve 113 to secure the nut 126 in a selected tightened threaded position, all in an understandable arrangement.

FIGS. 16, 17, 18, and 22 show the tool with an infinitely adjustable clutch system, mechanical prevention of the motor overload when the tool is reversed, and power output sockets for driving accessories such as the shown tube deburring cone and cleaning brush. The cone can fit inside the tube, and the brush can have an axial opening 115 for receiving the tube for exterior brushing. The clutch system 81 now has an adjustment knob 128 on the outside of the housing and bearing against a flat spring 129 for mounting of the knob 128 aligned on a fixed threaded shaft 131 which can be keyed to the housing 10 by use of key slots 125 and 130, in the shaft and in the housing, and with a conventional unshown intervening key. There is a modified clutch which presents the friction force between the gears 44 and 77. A stack of shaft flat friction plates 132, mounted on sleeve 113 which is attached to connecting gear 97 which has its spline teeth mate with command gear 77 spline teeth, is sandwiched between shaft pressure plates 133, suitably rotatable on the shaft 131, and gear pressure plates, suitably rotatably connected with the command drive gear 44. Pressure plate tangs 134 can make the rotation connections with the spline grooves, as shown.

Actuator plate 102 will move down effecting clutching connection between gears 77 and 44, as mentioned. The amount of friction pressure and thus the torque transmitted, and thus the cutting feed rate is fully adjustable by the knob 128. So the changing of the feed rate can be made while cutting. FIG. 22 shows enlarged detail of the friction pressure plates and their arrangement.

Again, upon depressing the tool trigger, actuator plate 98 will move downward pushing command gear 77 with spline gear 96 downward into engagement with connecting gear 97, and clutching gears 44 and 77 together, as previously mentioned. Now knob 128 can be employed to adjust the amount of torque to be transmitted for cutting.

Figure 16:
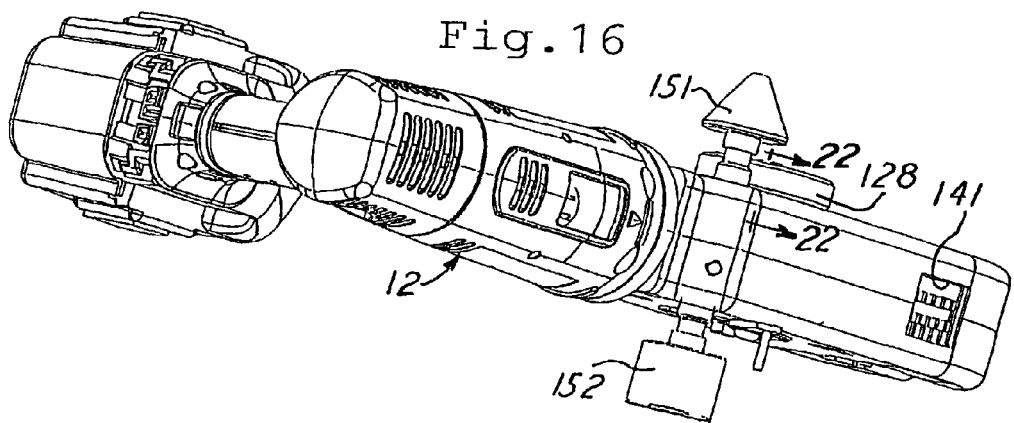
FIGS. 16 and 17 respectively are top and side perspective views of the tool of this invention with additional parts shown thereon.
Figure 17:
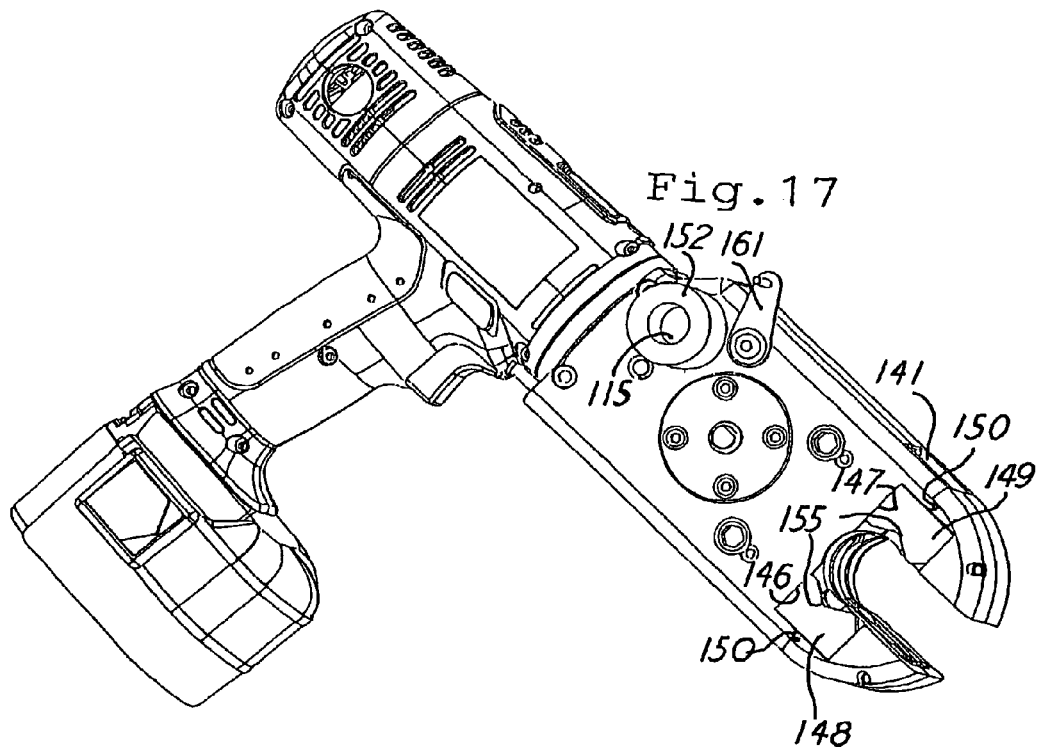

FIGS. 16, 17, and 18 show a housing window 141 on the housing top and extending through the housing halves 10 and 11 to expose the tool interior. Unseen, but should be understood, a transparent piece exists in the top window to cover it while permitting viewing of the tool interior. The tube 14 can have a cutoff mark 142 placed thereon, and the tubes and tool can then be relatively positioned to have the mark 142 aligned with the cutting blade 22 for accurate length cutting. Of course, the plane of the blade 22 is aligned with the window 141 and will have been rotated to be positioned adjacent the window 141. The gaps 52 would then have been aligned with the mark 142 for viewing into the tool.

FIGS. 17 and 18 show housing aligned side windows 146 and 147 with alignment guides 148 and 149 slideable in the two matching openings 146 and 147 in the housing. Thus two pairs of opposed halves 148 and 149 are in the openings 146 and 147 on both of the respective housing halves 10 and 11. The guides are thin but sturdy plates in movable pieces 148 and 149 and are movably mounted in slide slots on the housing flanking the respective window openings, and in a pair on each side of the housing for sliding movement toward and away from each other, and thus radially toward and away relative to the tube axis A. A Springs 150 abut the guides 148 and 149 to urge the guides toward the axis A and snug with the tube 14. Each guide has a V-shape 155 for nesting with the trapped tube 14 and thereby hold the tool and the tube 14 relative to each other.

FIGS. 16, 17, 18, and 23 show a power-take-off system integrated on the tool. Cone 151 and brush 152 are rotatably supported and driven by the power of the tool for respective deburring and brushing of tubes. FIG. 18 shows that motor 33 suitably rotates miter gear 153 and pinion gear 154 which is rotatably centered on a shaft 156 and rotates spur gear 166. A housing interior pivotal bracket 157 is also on the shaft 156, and it can pivot left and right about shaft 156, as viewed in FIG. 23, and it rotatably carries idler spur gear 158 which drives and is on a rotatable mounting shaft 159 on bracket 157. As seen in FIG. 23, the interior of shaft 159 has a female hex shape 160 which is respectively exposed to both sides of the housing exterior in the FIG. 23 pivoted position, and is axially aligned with two housing side openings, such as opening 165 in FIG. 18, for reception of mating hex shafts such as that which are on the cone 151 and on the brush 152 for respective and simultaneous rotation drive connections. For acceptable clarity in the drawing, the gears 166 and 158 are shown only in dotted lines as they are the gears that are added to the previous showings. Gear 166 is always in driving contact with idler gear 158.

A lever 161 is pivotally mounted on a housing post 162 to be on the exterior of the housing 10, and it is shown to have a square shape 163 at the housing interior and on the same plane as that of the bracket 157. The square shape presents a corner, as shown, to the edge 164 of the bracket 157 to thereby pivot the bracket 157 leftward, as in the shown pivoted position. So pivoting of the lever 161 will pivot the bracket 157 and thus shift the idler 158 between alternate engagement with the gear 166 and command drive gear 44. Different driven accessories, such as cone 151 and brush 152, can be mounted in the openings 165, as desired.

A compression spring 164 is suitably effective on the bracket 157 to yielding urge the idler 153 into engagement with the gear 44. Upon shifting the lever 161 to its shown position, that will interrupt the cutting drive. After the cutting is done and the tool is placed in the reverse mode, as explained, to avoid any damage to the motor after the cutting head is abruptly stopped, the idler gear 158 will pop out of tooth engagement and that moves bracket 157 back against the spring 167. That replaces an electronic monitoring circuit disclosed earlier.

On the cutting head stack of FIGS. 1 and 11, 12, and 13, the several gears 16 and 17 and the slate 18 are all held in one steady stack by have sliding circular radial shoulders 171 and 172, in snug contact with each other, and having shoulders 173 and 174 in snug contact. They also sequentially contact each other axially in their stacked relationship, as indicated. So the head is aligned radially, and those several pieces abut axially, all for close guidance of the several parts relative to each other in a unitized stack.

While specific embodiments are shown and described, it will be apparent to one skilled that changes can be made therein, and the scone of this invention should be determined by the appended claims.

What is claimed is:

1. In a powered workpiece cutter having a housing (10, 11); circularly shaped compound spur gear (16) and feed spur gear (17) having gear teeth (80) projecting thereon and being rotatably mounted in said housing about a common axis (A), said compound and feed spur gears being included in respective gear trains; a motor (33) mounted in said housing for rotating said compound and feed spur gears, said housing and said compound and feed spur gears each having a gap (52) extending therein and all said gaps being alignable together in only one direction viewed parallel to said axis for reception of a workpiece (14) in the aligned said gaps; said compound and feed spur gears having cam slots (61, 69, 58 and 67); cam follower shafts (56 and 66) connected to said compound and feed spur gears through said cam slots for rotatably driving said feed spur gear (17) in relationship with said compound spur gear (16); a cutting blade (22) supported by said cam follower shaft (56); and rollers (64) supported by said cam follower shaft (66), said blade and said rollers projecting into said gaps for engagement of and cutting of said workpiece upon applying said rotation of said feed spur gear (17) at a rotation speed different from the rotation speed of said compound spur gear (16) and thereby move said cam follower shafts in said slots and radially of said axis, the improvement comprising: said compound spur gear (16) and feed spur gear (17) have spur gear tooth pitch diameters (D-1, D-2) in respective lengths extending through said axis and diametrically across said gears, said length of said pitch diameter (D-1) of said feed spur gear (17) being different from the said length of said pitch diameter (D-2) of said compound spur gear (16) so that the feed spur gear (17) rotates at a rotation speed different from the rotation speed of said compound spur gear, wherein said two gear trains each include a plurality of gears, each gear train includes said compound spur gear (16), said feed spur gear (17), a command drive gear (44) and a command feed gear (77) of pitch diameters different from one another, and a clutch (81) rotationally connected with said two gear trains for rotationally connecting said command drive gear (44) and said command feed gear (77) together so that the rotation speed of said compound spur gear (16) is different than the rotation speed of the feed spur gear (17).

2. The powered workpiece cutter, as claimed in claim 1 including:
   a friction member (116) included in said clutch for providing operational friction drag controlling rotation action transmitted through said clutch, and
   a moveable adjuster operative on said friction member for altering the operational friction drag of said friction member to thereby control the relative rotation speeds of said command drive gear (44) and said command teed gear 77.

3. The powered workpiece cutter, as claimed in claim 1, wherein:
   said pitch diameters of said command drive gear (44) and said command feed gear (77) are different from each other in the same respective relationship as said pitch diameters (D-1 and D-2) of compound spur gear (16) and feed spur gear (17).

* * * * *